No. 897,558. PATENTED SEPT. 1, 1908.
R. SCHERL.
SUPPORT FOR MONOTRACK VEHICLES.
APPLICATION FILED MAY 21, 1908.

Witnesses:

Inventor:
Richard Scherl.
By his Attorney,

UNITED STATES PATENT OFFICE.

RICHARD SCHERL, OF BERLIN, GERMANY.

SUPPORT FOR MONOTRACK-VEHICLES.

No. 897,558.  Specification of Letters Patent.  Patented Sept. 1, 1908.

Application filed May 21, 1908. Serial No. 434,071.

*To all whom it may concern:*

Be it known that I, RICHARD SCHERL, gentleman, a subject of the Kingdom of Prussia, residing in Berlin, Kingdom of Prussia, German Empire, have invented certain new and useful Improvements in or Relating to Supports for Monotrack-Vehicles, of which the following is a specification.

This invention relates to a device for raising and lowering lateral supporting wheels in single track vehicles, for instance railway vehicles which are traveling in the well known manner on a single rail. The lateral supporting wheels come to rest according to this invention, when the vehicle is standing still or traveling slowly, on auxiliary rails arranged at both sides of the track or of the main rail, while during normal driving, they are lifted off from them by means of a centrifugal device. The supporting wheels are intended to become operative when the speed of the vehicle falls below a certain limit, for as is well known a single track vehicle can remain vertical only at a certain speed, while, when the speed descends below the said limit, it is liable to turn over. The device for generating power for raising and lowering the lateral supporting wheels, for instance, a centrifugal governor, can therefore be connected to the driving device of the vehicle in such manner that when the minimum speed required for maintaining the vehicle vertical, is reached, it lifts the supporting wheels from the rails, while when the speed falls below the said limit, it allows the supporting wheels to come to rest on the rails.

Two constructions of the device according to this invention are diagrammatically illustrated by way of example in the accompanying drawing.

Figure 1:
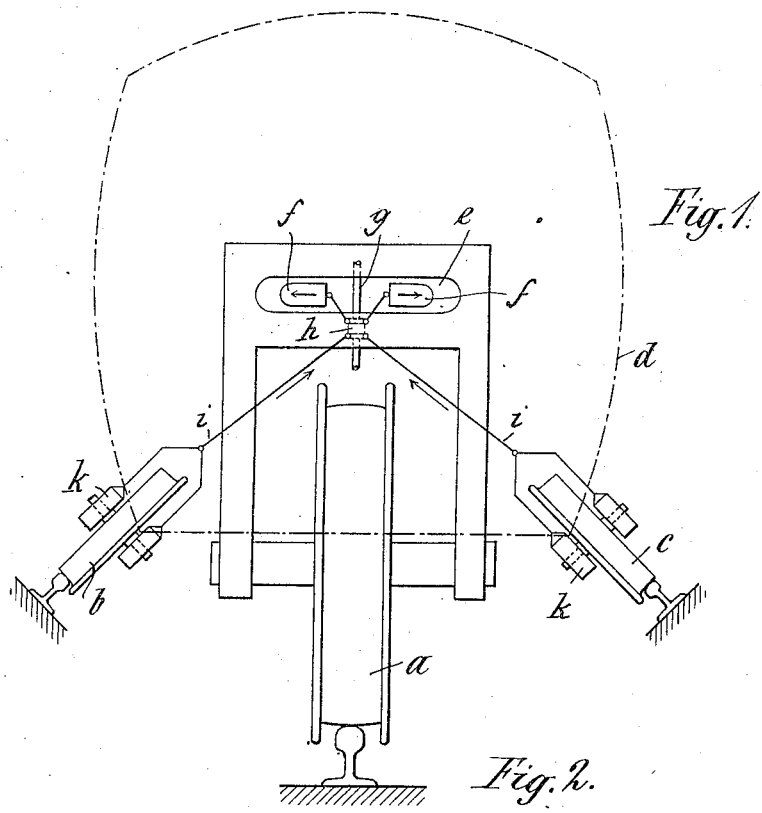
Figure 2:
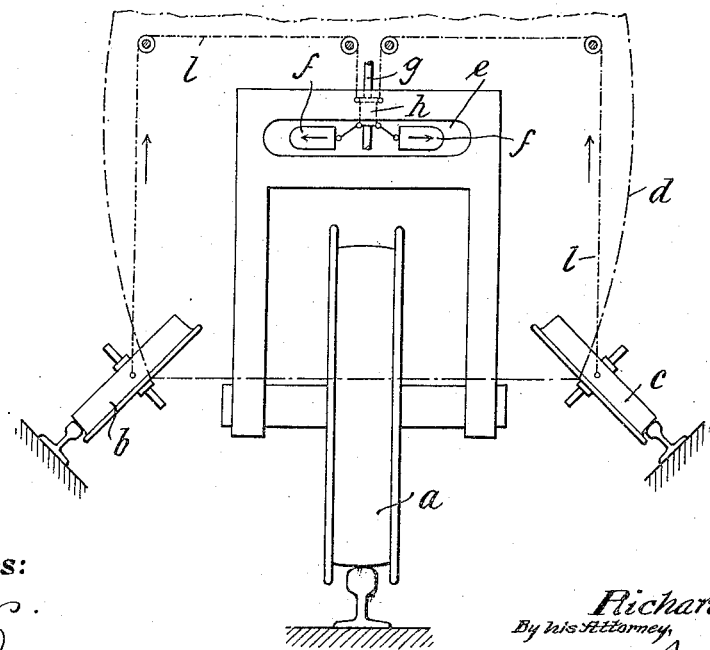

In Figures 1 and 2, the frame of a carriage of a monorail railway is marked $d$. The carriage is normally supported by the main or road wheels $a$ which can also be combined into bogies. At both sides of the carriage are adjustably arranged the supporting wheels $b$ and $c$. The raising of the oblique supporting wheels can be effected both in oblique and in vertically arranged guides.

The power required for raising and lowering the supporting wheels, is generated by a device $e$ which, in the present case, is assumed to be a centrifugal governor in which the rotating masses $f$ move in and out in a plane at a right angle to the axis $g$ of the governor, the sleeve $h$ of the governor, connected by rods $i$ to the adjustable bearings $k$ of the supporting wheels $a$, bringing about the raising of the said wheels at a given speed of rotation of the governor. Of course the transmission of movement of the governor to the supporting wheels could also be effected in some other simple manner, for instance, by means of a rope, chain or similar parts ($l$, Fig. 2). The supporting wheels, in order to enable the smallest forces of the sleeve of the governor to be utilized, could be suitably balanced.

What I claim as my invention and desire to secure by Letters Patent is:

1. In a device for raising and lowering supporting wheels in a monotrack vehicle the combination of central wheels, supporting wheels laterally arranged on the vehicle, means for lifting the lateral wheels when the vehicle is running at normal speed and for automatically lowering the said wheels when the vehicle slows down or stops so that the vehicle normally runs on the central wheels only.

2. In a device for raising and lowering supporting wheels in a monotrack vehicle the combination of central wheels, supporting wheels laterally arranged on the vehicle, a centrifugal governor to lift the lateral wheels when the vehicle is running at normal speed and automatically to lower the said wheels when the vehicle slows down or stops so that the vehicle normally runs on the central wheels only.

In witness whereof I have hereunto signed my name this 8th day of May 1908 in the presence of two subscribing witnesses.

RICHARD SCHERL.

Witnesses:
 HENRY HASPER,
 WOLDEMAR HAUPT.